United States Patent
Yang et al.

(10) Patent No.: US 11,303,737 B2
(45) Date of Patent: Apr. 12, 2022

(54) METHOD AND DEVICE FOR DATA TRANSMISSION

(71) Applicant: Wangsu Science & Technology Co., Ltd., Shanghai (CN)

(72) Inventors: Zongxing Yang, Shanghai (CN); Zheng Li, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 17/061,517

(22) Filed: Oct. 1, 2020

(65) Prior Publication Data

US 2021/0195000 A1    Jun. 24, 2021

Related U.S. Application Data

(63) Continuation of application No. PCT/CN2020/079351, filed on Mar. 13, 2020.

(30) Foreign Application Priority Data

Dec. 24, 2019   (CN) .......................... 201911347142.4

(51) Int. Cl.
*G06F 15/16* (2006.01)
*H04L 69/163* (2022.01)
*H04L 67/5651* (2022.01)
*H04L 67/141* (2022.01)
*H04L 67/1074* (2022.01)

(52) U.S. Cl.
CPC .......... *H04L 69/163* (2013.01); *H04L 67/108* (2013.01); *H04L 67/141* (2013.01); *H04L 67/2828* (2013.01)

(58) Field of Classification Search
USPC ................................. 709/231, 236, 234, 235
See application file for complete search history.

(56) References Cited

U.S. PATENT DOCUMENTS

| | | | |
|---|---|---|---|
| 2011/0173345 A1* | 7/2011 | Knox | H04L 69/08 |
| | | | 709/246 |
| 2015/0089028 A1* | 3/2015 | Zheng | H04L 67/06 |
| | | | 709/219 |
| 2015/0237060 A1 | 8/2015 | Wease | |

(Continued)

FOREIGN PATENT DOCUMENTS

| | | |
|---|---|---|
| CN | 102523225 A | 6/2012 |
| CN | 103283193 A | 9/2013 |

(Continued)

OTHER PUBLICATIONS

Wangsu Science & Technology Co., Ltd., First Office Action (CN), CN201911347142.4, dated Oct. 30, 2020, 12 pgs.

(Continued)

*Primary Examiner* — Lan Dai T Truong
(74) *Attorney, Agent, or Firm* — USCH Law, PC

(57) ABSTRACT

The present disclosure discloses a method and a device for data transmission and belongs to the network communication technology. According to some embodiments, a sending end establishes a communication connection with a receiving end; the sending end splits the data packet to be transmitted into multiple data units; and the sending end transmits the multiple data units to the receiving end through multiple data streams.

19 Claims, 4 Drawing Sheets

(56) References Cited

U.S. PATENT DOCUMENTS

| | | | | |
|---|---|---|---|---|
| 2017/0223438 A1* | 8/2017 | Detwiler | ................ | H04Q 11/00 |
| 2017/0353380 A1 | 12/2017 | Ergen et al. | | |
| 2019/0149449 A1* | 5/2019 | Morris | .................... | H04L 45/02 |
| | | | | 709/238 |
| 2019/0312815 A1* | 10/2019 | Altman | ............. | H04W 28/0236 |
| 2021/0114616 A1* | 4/2021 | Altman | ................ | H04W 40/02 |

FOREIGN PATENT DOCUMENTS

| | | |
|---|---|---|
| CN | 107948215 A | 4/2018 |
| CN | 108243211 A | 7/2018 |
| CN | 109474642 A | 3/2019 |
| CN | 109951260 A | 6/2019 |
| CN | 109981674 A | 7/2019 |
| CN | 110391989 A | 10/2019 |
| EP | 0485252 A2 | 5/1992 |
| EP | 3544261 A1 | 9/2019 |
| KR | 20190000468 A | 1/2019 |
| KR | 20190069154 A | 6/2019 |

OTHER PUBLICATIONS

Ashane1314 (author's online username), "What head-of-line blocking is and how to solve it," Online Article, CSDN.net, Oct. 25, 2020, 5 pgs.

Wangsu Science & Technology Co., Ltd., Office Action, CN Patent Application No. 201911347142.4, dated Oct. 30, 2020, 12 pgs.

Wangsu Science & Technology Co., Ltd., International Search Report, PCT/CN2020/079351, dated Oct. 9, 2020, 4 pgs.

Wangsu Science & Technology Co., Ltd., Extended European Search Report, EP20775796.4, dated Jul. 21, 2021, 7 pgs.

\* cited by examiner

METHOD AND DEVICE FOR DATA TRANSMISSION

CROSS REFERENCE TO RELATED APPLICATIONS

The present application is a continuation of PCT Application No. PCT/CN2020/079351, entitled "METHOD AND DEVICE FOR DATA TRANSMISSION," filed Mar. 13, 2020, which claims priority to Chinese Patent Application No. 201911347142.4, entitled "METHOD AND DEVICE FOR DATA TRANSMISSION," filed Dec. 24, 2019, each of which is incorporated by reference herein in its entirety.

TECHNICAL FIELD

The present disclosure relates to the network communication technology, in particular to a method and device for data transmission.

BACKGROUND

Under a remote procedure call (RPC) framework, a sending end and a receiving end may be deployed in different geographical locations according to a distributed structure. The sending end may request service on the receiving end remotely through a network, that is, remotely calling objects on the receiving end, based on a processing logic of calling the objects in a local application and without understanding an underlying network transmission process.

Specifically, after the sending end establishes a connection with the receiving end and completes an addressing process, the sending end may hand over a call request (carrying method and parameter information) to the client if a remote procedure call needs to be initiated. The client end applies packaging processing such as encoding and encapsulating to the call request, and then sends the packaged call request to the receiving end. A stub of the receiving end receives and decodes the packaged call request, and then calls a function of the receiving end. The receiving end performs processing of the calling based on the parameter to obtain a call result. After that, the receiving end may package the call result and return it to the client. In this way, the client end receives and decodes the call result, and then provides a final result to the sending end.

The inventor of the present application finds that the existing technology has at least the following problems. When transmitting a large data packet based on the RPC framework, on the one hand, the data content needs to be fully loaded to the memory before the data is sent and after the data is received, which may occupy large memory resources of the sending end and the receiving end; on the other hand, more bandwidth resources may be occupied and longer time may be taken in the transmission process, and there may be a high possibility of packet loss, especially in a weak network environment.

SUMMARY

In order to solve the problems of the existing technology, certain embodiments of the present disclosure provide a method, a device and a system for data transmission. The technical solution is as follows.

In a first aspect, a method for data transmission is provided, which includes:

establishing a communication connection with a receiving end;

splitting a data packet to be transmitted into multiple data units;

transmitting the multiple data units to the receiving end through multiple data streams.

In a second aspect, a device for data transmission is provided, which includes:

a connecting module, configured to establish a communication connection with a receiving end;

a splitting module, configured to split a data packet to be transmitted into multiple data units;

a transmitting module, configured to transmit multiple data units to the receiving end through multiple data streams.

In a third aspect, a network device is provided, which includes a processor and a memory. The memory stores at least one instruction, at least one program, a code set or an instruction set, and the at least one instruction, the at least one program, the code set or the instruction set is loaded and executed by the processor to perform the method for data transmission as described in the first aspect.

In a fourth aspect, a computer readable storage medium is provided, which stores at least one instruction, at least one program, a code set or an instruction set; and the at least one instruction, the at least one program, the code set or the instruction set is loaded and executed by the processor to perform the method for data transmission as described in the first aspect.

The solution provided in the embodiments of the present disclosure has the following beneficial effects. In the embodiments of the present disclosure, the sending end establishes the communication connection with the receiving end, splits the data packet to be transmitted into the multiple data units, and transmits the multiple data units to the receiving end through the multiple data streams. In this way, the sending end splits the data packet to be transmitted into multiple layers to obtain the data units, and transmits the data units through the multiple data streams in a form of the data unit. The receiving end receives the data units and assembles the data units into a small data packet. On the one hand, only a small number of rather than all data units need to be loaded before the data is sent and after the data is received, which may save the memory resources of the sending end and the receiving end. On the other hand, head-of-line blocking may be effectively avoided and the time delay may be reduced in the transmission process, and the effect of reconnection and data retransmission caused by network factors may be reduced, thereby improving quality of the data transmission and reducing the bandwidth resources occupied in the transmission process.

BRIEF DESCRIPTION OF THE DRAWINGS

In order to illustrate the technical solutions in the embodiments of the present disclosure more clearly, the accompanying drawings used in the description of the embodiments will be briefly described below. It is apparent that the drawings in the following description are only some embodiments of the present disclosure. For those skilled in the art, other drawings may also be obtained in accordance with the drawings without any inventive effort.

DETAILED DESCRIPTION

In order to make objectives, technical solutions and advantages of the present disclosure more clear, the embodiments of the present disclosure will be described in details with reference to the accompany drawings.

An embodiment of the present disclosure provides a method for data transmission, which may be implemented by a sending end and a receiving end together. Herein, both the sending end and the receiving end may be network devices with data transceiving and processing functions, such as servers, computers, and the like. An RPC framework may be deployed on the sending end and the receiving end, both of which may realize data transmission and remote call of functions through the RPC framework. During the call, the sending end may send a call request to the receiving end, and add a function to be called and a parameter required when calling the function into the call request. In this embodiment, the sending end may send the call request to the receiving end in a form of a data packet. When a data volume of the data packet is too large, the sending end may first split the data packet, and then transmit the data packet to the receiving end in the split data packet specification. After receiving the split data packet, the receiving end may first perform assembly processing, and then perform subsequent processing on the assembled data packet. It should be noted that, in different embodiments, the functions of the sending end and the receiving end may be interchanged, that is, the receiving end may send the call request to the sending end so as to realize the remote call of a method function of the sending end, a specific process of which is basically the same as the process that the sending end initiates the remote call, which is not repeated again in this embodiment.

Figure 1:
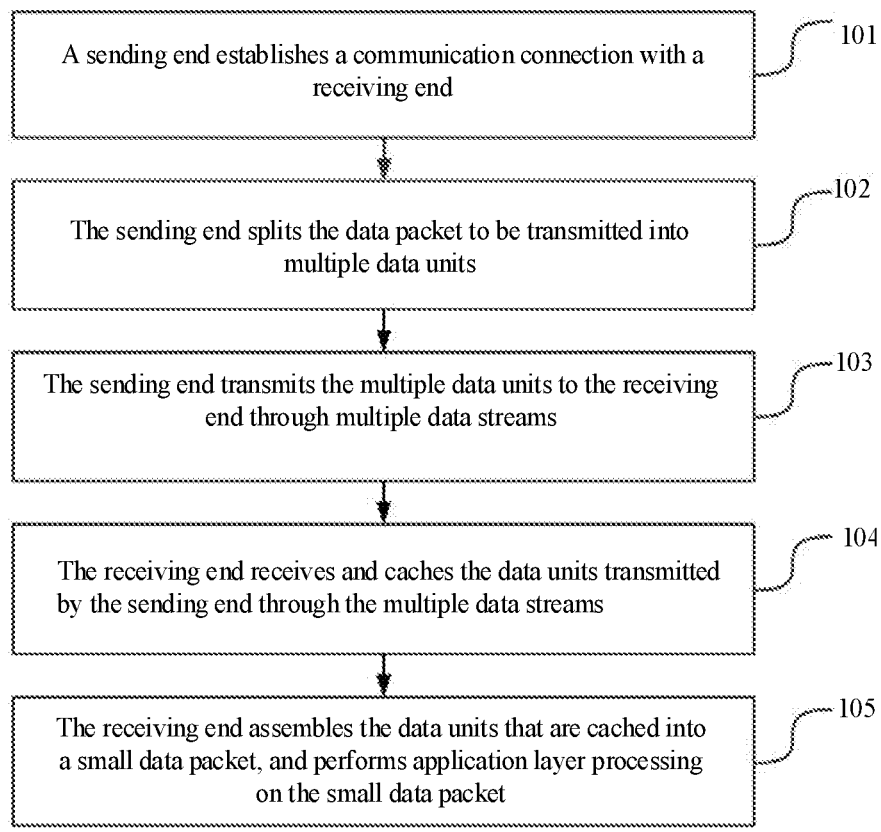
FIG. 1 is a flowchart of a method for data transmission provided in an embodiment of the present disclosure.

A processing flow shown in FIG. 1 will be described in detail below with reference to a specific embodiment, and the content may be as follows.

In step 101, the sending end establishes a communication connection with the receiving end.

In the implementation, when the sending end under the RPC framework needs to remotely call the method function of the receiving end, the sending end may first establish a transmission control protocol (TCP) connection with the receiving end. The TCP connection may be an on-demand connection, that is, the sending end actively initiates establishment with the receiving end when needing to perform the remote call, and the sending end actively disconnects after the call ends. Or the TCP connection may be a long-lived connection, that is, the connection between the sending end and the receiving end is maintained for a long time whether or not the data packet is sent, and multiple remote call processes may use the same TCP connection. After that, the sending end may establish multiple data streams on the above TCP connection with the receiving end. Herein, each of the data streams may correspond to a thread on both the sending end and the receiving end, and different threads are used to send or receive data on different data streams. The above multiple data streams may be bidirectional streams that do not interfere with each other and the streams are independent of each other, so that the data transmission blocking and failed retransmission on a single data stream do not affect the data transmission of other data streams on the same TCP connection. The sending end may send data to the receiving end through the data stream; otherwise, the receiving end may also send data to the sending end through the above data stream. In this embodiment, after the data stream is established, the sending end and the receiving end may detect the health state of each of the data streams by periodically sending a keepalive_probe data packet, so as to adjust the data transmission in time according to a detection result.

In one embodiment, the sending end and the receiving end may establish multiple data streams on the communication connection according to their load information, and a corresponding processing may be as follows. The sending end sends a connection establishment request carrying the load information of the sending end to the receiving end. The receiving end establishes the communication connection with the sending end, and initializes the multiple data streams on the communication connection based on the load information of the sending end and the load information of the receiving end.

In the implementation, when sending the connection establishment request to the receiving end, the sending end may detect the load information of the sending end, such as local memory, bandwidth, CPU, etc., and add the detected load information of the sending end to the connection establishment request. After receiving the connection establishment request sent by the sending end and carrying the load information of the sending end, the receiving end may establish the communication connection with the sending end, and may also collect the load information of the receiving end, such as the local memory, the bandwidth, the CPU, etc., and then may initialize the multiple data streams on the communication connection based on the load information of the sending end and the load information of the receiving end. Specifically, the number of data streams on the communication connection may be equal to the number of CPU cores on the receiving end by default, and then the number of data streams and the flow window size of each of the data streams may be computed by further referring to the load of each CPU on the receiving end and the sending end, as well as usage of the memory and the bandwidth in the last 5 minutes. In this way, the number and the flow window size of data streams are determined based on the load status of the sending end and the receiving end, which may make full use of device resources of the sending end and the receiving end to improve data transmission efficiency, and may prevent data transmission quality from being affected due to device overload.

In step 102, the sending end splits the data packet to be transmitted into multiple data units.

In the implementation, after establishing multiple data streams, that is based on the communication connection, with the receiving end, the sending end may send the data packets to the receiving end through the multiple data streams. Specifically, the sending end may first split the data packet to be transmitted to obtain multiple small data packets with small data volume. After that, the sending end may compress the small data packets, and then continue to split each of the small data packets into multiple data units with smaller data specification. Alternatively, in different embodiments, the sending end may further split the data units based on the same principle to obtain data units with smaller data volume, so as to alleviate transient pressure of the transmission caused by too large data packets.

In one embodiment, when splitting a large data packet, the sending end may determine the splitting rule based on the size and type of data packet, and the load information of the sending end and the receiving end. Correspondingly, the processing of step 102 may be as follows. The sending end determines the splitting rule of the data packet based on the size and type of the data packet to be transmitted, and the load information of the sending end and the load information of the receiving end. The sending end splits the data packet to be transmitted into multiple small data packets according to the splitting rule of the data packet, and splits each of the small data packets into multiple data units.

In the implementation, when splitting the data packet to be transmitted, the sending end may first determine the size and type of the data packet to be transmitted, and then determine a corresponding scheme for splitting the data packet according to the type and size. At the same time, the sending end may also refer to the load information of the receiving end and the load information of the sending end to determine the splitting rule of the data packet. Furthermore, the sending end may split the data packet to be transmitted into multiple small data packets according to the splitting rule of the data packet, and split each of the small data packets into multiple data units. Herein, the load information of the receiving end may be sent from the receiving end to the sending end when the sending end establishes the communication connection with the receiving end. It should be noted that, when the load is high, the data packet with smaller data volume may be selected as much as possible to transmit in order to avoid transmission congestion of the data stream, so that the data packet to be transmitted may be split into data packets with a larger number and a smaller data volume.

In one embodiment, the sending end may configure a unit ID indicating a specific data content for each of the data units obtained by splitting after splitting the data packet. Correspondingly, the processing after step 102 may be as follow. For any data unit, the sending end generates the unit ID of the data unit based on a small packet ID of the small data packet to which the data unit belongs and a data offset of the data unit in the small data packet, and adds the unit ID to the data unit.

In the implementation, after splitting the data packet to be transmitted multiple times to obtain the multiple data units, the sending end may add the unit ID to each of the data units to mark each of the data units, and the unit IDs of the multiple data units may be incremented sequentially. Specifically, for any data unit, the sending end may first determine the small data packet to which the data unit belongs and the data offset of the data unit in the small data packet, and then generates the unit ID of the data unit, based on a preset algorithm, according to a small packet ID of the small data packet and the above data offset, so as to add the unit ID to the data unit. In this way, each of the data units may be uniquely identified through different unit IDs, and the specific data content corresponding to each of the data units may be quickly determined through the unit ID. It should be noted that the small packet ID may be generated by the sending end for each of the small data packets obtained through splitting when the sending end splits the data packet to be transmitted, which is used to uniquely identify the small data packet. And the sending end may further refer to the offset location of the small data packet in the data packet to be transmitted when generating the small packet ID, so as to determine, through the small packet ID, the specific data content of the small data packet in the data packet to be transmitted.

In step 103, the sending end transmits the multiple data units to the receiving end through the multiple data streams.

In the implementation, after splitting the data packet to be transmitted multiple times to obtain the data units, the sending end may transmit the split data units to the receiving end through the multiple data streams established with the receiving end. Herein, one stream may transmit multiple data units, and multiple data units of one small data packet may be transmitted in multiple streams. During the transmission process, the sending end may transmit data units with different data volume in different data streams according to the load status of each of the data streams.

In step 104, the receiving end receives and caches the data units that the sending end transmits through the multiple data streams.

In the implementation, after establishing the multiple data streams that are based on the communication connection with the sending end, the receiving end may receive the data units that the sending end transmits through the above multiple data streams via data receiving threads corresponding to the multiple data streams, and then may cache the received data units to a unified cache. In this embodiment, the receiving end may be configured with multiple caches, and each of the caches may be used to cache the data units of different small data packets.

In step 105, the receiving end assembles the cached data units into small data packets, and performs application layer processing on the small data packets.

In the implementation, the receiving end may perform assembly processing on the cached data units while receiving and caching the data units. When the multiple cached data units may be successfully assembled into a complete small data packet, the receiving end may transmit the assembled small data packet to the application layer for processing, and delete the relevant data units in the cache at the same time.

In one embodiment, based on the process that the sending end adds the unit ID to the data unit, the processing of step 105 may be specifically as follows. For each of the cached data units, the small packet ID corresponding to the data unit and the data offset of the data unit in the small data packet are determined according to the unit ID carried in the data unit. And the cached data units are assembled into the small packet according to the small packet ID and the data offset that correspond to each of the data units.

In the implementation, after receiving the data units sent by the sending end through the multiple data streams and caching the data units, the receiving end may extract the unit IDs carried in the data units, and then complete the assembly processing of each of the small data packets according to the unit IDs. In the above process, for each of the cached data units, the server may restore, based on a preset algorithm, the small packet ID corresponding to the data unit and the data offset of the data unit in the small packet through the unit ID carried in the data unit, and then separately summarizes the data units that belong to different small packets according to the small packet ID. In this way, all the data units corresponding to the same small packet ID may be assembled into the small packet according to the data offset corresponding to each of the data units.

In one embodiment, after establishing the data stream with the receiving end, the sending end may send a data stream ID for uniquely identifying each of the data streams to the receiving end, so as to realize the connection migration between the sending end and the receiving end. Therefore, before sending the connection establishment request to the receiving end, the sending end may generate the data stream IDs of the multiple data streams, and then add all the data stream IDs to the connection establishment request. After the receiving end receives the connection establishment request and establishing the communication connection with the sending end, the parameter information of the communication connection may be stored corresponding to the above data stream IDs.

Figure 2:
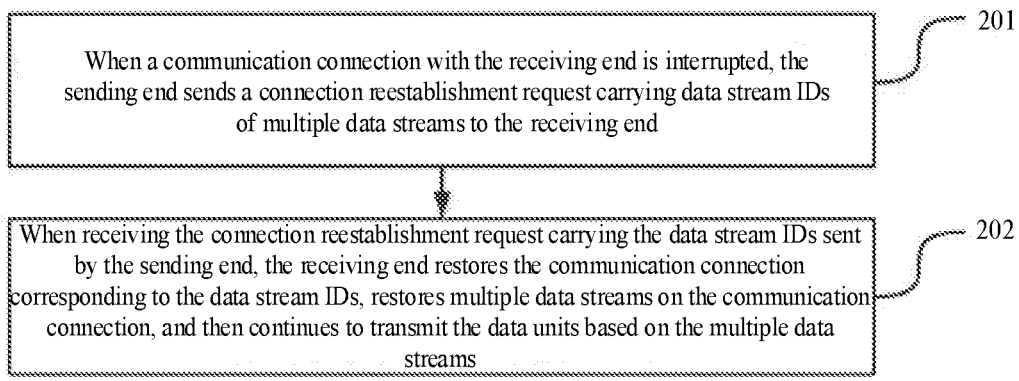
FIG. 2 is a flowchart of a method for connection migration provided in an embodiment of the present disclosure.

Based on the above processing for the data stream ID, the process shown in FIG. 2 may also be included between the sending end and the receiving end.

In step 201, when the communication connection with the receiving end is interrupted, the sending end sends the connection reestablishment request carrying the data stream IDs of the multiple data streams to the receiving end.

In the implementation, if the sending end detects that the communication connection with the receiving end is interrupted in the process of sending data to the receiving end, the sending end may obtain the data stream IDs of the multiple data streams generated before the communication connection is established, and send the connection reestablishment request carrying these data stream IDs to the receiving end.

In step 202, when receiving the connection reestablishment request carrying the data stream IDs sent by the sending end, the receiving end restores the communication connection corresponding to the data stream IDs, restores the multiple data streams on the communication connection, and then continues to transmit the data units based on the multiple data streams.

In the implementation, the receiving end may receive the connection reestablishment request sent by the sending end, and determine whether the data stream ID is carried therein. If yes, the receiving end may restore the communication connection corresponding to the data stream ID according to the stored data stream ID and the parameter information of the communication connection, then restore the multiple data streams on the communication connection, and then continue to transmit the data units based on the multiple data streams. It will be understood that the above data stream ID has nothing to do with the network (information such as the IP address, the port, etc.) in which the sending end is disposed. When the network in which the sending end is disposed changes, the data stream ID does not change, so that the receiving end may use the data stream ID to determine the original communication connection, and still use the original data stream to transmit data with the sending end, so as to realize the connection migration, avoid multiple establishments of the connection, reduce unnecessary data retransmission caused by connection reestablishment and ensure that business logic is not interrupted.

Figure 3:
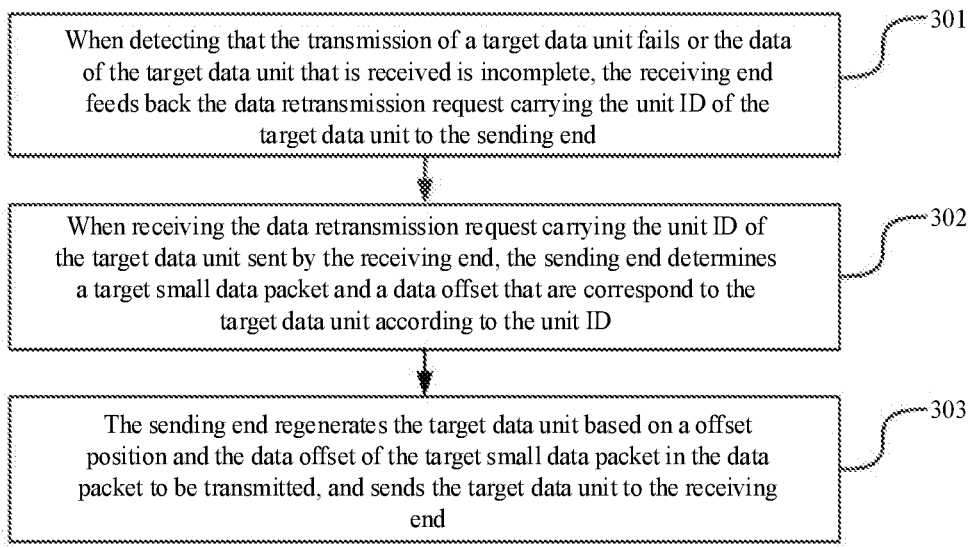
FIG. 3 is a flowchart of a method for data retransmission provided in an embodiment of the present disclosure.

In one embodiment, the sending end may cache the offset position of each of the small data packets in the data packet to be transmitted after splitting the data packet to be transmitted into the small data packets, so as to perform data retransmission processing as shown in FIG. 3 based on the offset position and the unit ID described above, and the specific process may be as follows.

In step 301, when detecting that the transmission of the target data unit fails or the data of the received target data unit is incomplete, the receiving end feeds back the data retransmission request carrying the unit ID of the target data unit to the sending end.

In the implementation, when receiving the data units sent by the sending end, the receiving end may determine the total data volume of each of the data units according to the unit ID of the data unit, and then may use the total data volume and the received data volume of the data unit to determine whether the received data unit is complete. At the same time, considering that the sending end sends the data units in sequence by the unit ID, the receiving end should receive the data units in sequence when the data is normally transmitted. Therefore, it may be set that the transmission of a data unit A is determined to be failed if the receiving end has cumulatively received a preset number of the data units whose sending orders are subsequent to the data unit A before receiving the data unit A. In this embodiment, when it is detected that the transmission of the target data unit fails or the data of the received target data unit is incomplete, the receiving end may feed back the data retransmission request carrying the unit ID of the target data unit to the sending end, so that the sending end resends the target data unit.

In step 302, when receiving the data retransmission request carrying the unit ID of the target data unit sent by the receiving end, the sending end determines the target small data packet and the data offset that correspond to the target data unit according to the unit ID.

In step 303, the sending end regenerates the target data unit based on the offset position and the data offset of the target small data packet in the data packet to be transmitted, and sends the target data unit to the receiving end.

In the implementation, after determining the target small data packet to which the target data unit belongs, the sending end may determine the offset position of the target small data packet in the data packet to be transmitted according to the cache content, then determine the specific data content corresponding to the target data unit according to the data offset of the target data unit in the target small data packet and the above offset position, and then regenerate the target data unit. After that, the sending end may transmit the target data unit to the receiving end through any data stream on the communication connection. In this way, when a certain data unit needs to be retransmitted, the sending end may determine and generate the data content that needs to be retransmitted without reloading the entire data packet to be transmitted, which may reduce resources consumption of data retransmission devices and improve efficiency of the data retransmission. Of course, in order to facilitate the receiving end to complete the assembly processing of the target small data packet to which the target data unit belongs as soon as possible, the sending end may add priority information to the target data unit, which may trigger the receiving end to receive and process the target data unit preferentially. In addition, while sending the data units, the sending end may also assign different transmission priorities to different data units according to a data type (such as key data, supplementary data, etc.) to which each of the data units belongs and/or a current load status of the data stream, so that the sending end may preferentially send the data units with higher transmission priority. For example, if the current load of the data stream is high and only the data units with small data volume may be transmitted, a higher transmission priority may be set for the data units with smaller data volume, and vice versa.

In this embodiment, the sending end may also decide whether to add or delete the data stream based on the data transmission condition of each of the data streams, and a corresponding processing may be as follows. The sending end sends a data stream addition request to the receiving end according to the data transmission condition of multiple data streams. When receiving the data stream addition request sent by the sending end, the receiving end creates a new data stream based on the communication connection. Or, the sending end sends a data stream interruption request to the receiving end according to the data transmission condition of the multiple data streams and/or the load status of the device. When receiving the data stream interruption request sent by the sending end, the receiving end interrupts the target data stream corresponding to the data stream interruption request and stops receiving the data units on the target data stream.

In the implementation, when sending the data units to the receiving end through the multiple data streams on the communication connection, the sending end may monitor the data transmission condition of the multiple data streams in real time, and decide whether to perform a data stream addition processing according to a monitoring result, that is, judge whether to send the data stream addition request to the receiving end. For example, when it is detected that the load of the multiple data streams is higher than a preset overload threshold for a long time, the data stream may be appropriately increased, so that the sending end may send the data stream addition request to the receiving end.

Similarly, when sending the data units to the receiving end through the multiple data streams on the communication connection, the sending end may monitor the data transmission condition of the multiple data streams and the load stat of the device (including the load status of the sending end and the load status of the receiving end) in real time, and judge whether to perform a data stream deletion processing according to the monitoring result, that is, decide whether to send a data stream interruption request to the receiving end. For example, when it is detected that the load of the multiple data streams is lower than a preset idle threshold for a long time, the data stream may be appropriately deleted, so that the sending end may send the data stream interruption request corresponding to one or more data streams to the receiving end. The data stream interruption request may carry the data stream ID of the data stream that needs to be interrupted. Or, when it is detected that the data transmission quality of a data stream B is poor, the sending end may send the data stream interruption request corresponding to the data stream B to the receiving end, and at the same time, may also send the data stream addition request carrying the data stream ID of the data stream B to the receiving end, so that the data on the data stream B is transferred to a new data stream for transmission after the new data stream is created between the receiving end and the sending end.

It should be noted that the detection of the multiple data streams is real-time. When requirements for increasing or decreasing the data stream are met, the sending end and the receiving end increase or interrupt the data stream.

Based on the above-processing of the sending end, when receiving the data stream addition request sent by the sending end, the receiving end may first create the new data stream based on the communication connection between the sending end and the receiving end, and then judge whether to perform the migration processing of the data transmission according to a carrying condition of a stream identification in the data stream addition request. When receiving the data stream interruption request sent by the sending end, the receiving end may determine the target data stream corresponding to the stream identification carried in the data stream interruption request, then close the target data stream, and stop receiving the data units that are subsequently transmitted by the sending end through the target data stream. In this way, adding or deleting the data streams may not only avoid idle resources and ensure resource utilization, but also prevent the data transmission quality from being affected due to the data stream overload.

It should be noted that the sending end may set parameters for the new data stream that needs to be created by adding information such as priority, flow window size and the like to the data stream addition request, so that the receiving end may create, based on the information added in the data stream addition request, the new data stream that meets the parameter corresponding to the information with the sending end after receiving the data stream addition request.

In one embodiment, the receiving end achieves load balancing of the data transmission between the multiple data streams by sending a flow adjustment instruction to the sending end, and a corresponding processing may be as follows. The receiving end sends the flow adjustment instruction to the sending end according to a receiving load status of the multiple data streams. The sending end receives the flow adjustment instruction sent by the receiving end, and adjusts the flow window size of the data stream according to the stream identification and a specified flow threshold that are carried in the flow adjustment instruction.

Herein, the flow adjustment instruction may carry the stream identification and the specified flow threshold.

In the implementation, when receiving the data units of the sending end, the receiving end may detect the receiving load status corresponding to each of the data streams, and then send the flow adjustment instruction to the sending end according to the receiving load status. The flow adjustment instruction may carry the stream identification and the specified flow threshold. For example, when detecting that the data stream is in an overload status, the receiving end may send the flow adjustment instruction for the data stream to the sending end, so that the sending end reduces the flow window size of the data stream. When detecting that the data stream is in an idle state, the receiving end may send the flow adjustment instruction for the data stream to the sending end, so that the sending end enlarges the flow window size of the data stream. Therefore, after receiving the flow adjustment instruction sent by the receiving end, the sending end may determine the data stream to be adjusted according to the stream identification carried in the flow adjustment instruction, and then adjust the flow window size of the data stream based on the specified flow threshold carried in the flow adjustment instruction. In this way, the flow adjustment instruction may effectively avoid uneven load among the multiple data streams, improve utilization of network resources during the transmission process, and prevent failure of the data transmission due to the data stream overload.

In the embodiments of the present disclosure, the sending end establishes the communication connection with the receiving end, splits the data packet to be transmitted into the multiple data units, and transmits the multiple data units to the receiving end through multiple data streams. In this way, the sending end splits the data packet to be transmitted into multiple layers to obtain the data units, and transmits the data units through the multiple data streams in a form of the data unit. The receiving end receives the data units and assembles the data units into the small data packet. On the one hand, only a small number of rather than all the data units need to be loaded before the data is sent and after the data is received, which may save the memory resources of the sending end and the receiving end. On the other hand, head-of-line blocking may be effectively avoided and the time delay may be reduced in the transmission process, and the effect of of reconnection and data retransmission caused by network factors may be reduced, thereby improving the quality of the data transmission and reducing the bandwidth resources occupied in the transmission process.

Figure 4:
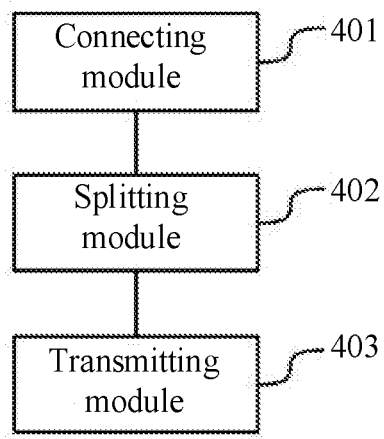
FIG. 4 is a structural schematic diagram of a device for data transmission provided in an embodiment of the present disclosure.

Based on the same technical concept, an embodiment of the present disclosure also provides a device for data transmission. As shown in FIG. 4, the device includes:

a connecting module 401, configured to establish a communication connection with a receiving end;

a splitting module 402, configured to split a data packet to be transmitted into multiple data units;

a transmitting module 403, configured to transmit the multiple data units to the receiving end through multiple data streams.

Figure 5:
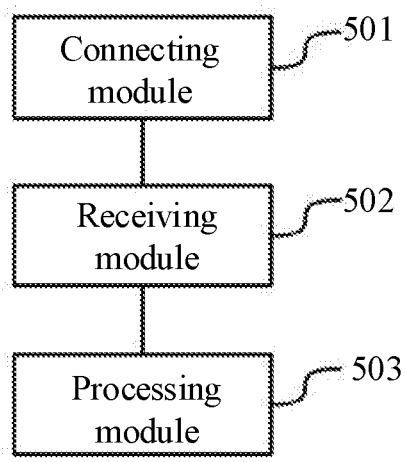
FIG. 5 is a structural schematic diagram of another device for data transmission provided in an embodiment of the present disclosure.

Based on the same technical concept, an embodiment of the present disclosure also provides a device for data transmission. As shown in FIG. 5, the device includes:

a connecting module 501, configured to establish a communication connection and multiple data streams based on the communication connection with a sending end;

a receiving module 502, configured to receive and cache data units transmitted by the sending end through the multiple data streams;

a processing module 503, configured to assemble the data units that are cached into a small data packet, and perform application layer processing on the small data packet.

Based on the same technical concept, an embodiment of the present disclosure also provides a system for data transmission which includes a sending end and a receiving end. Herein, the sending end and the receiving end cooperate to perform the method for data transmission described in above embodiments.

Figure 6:
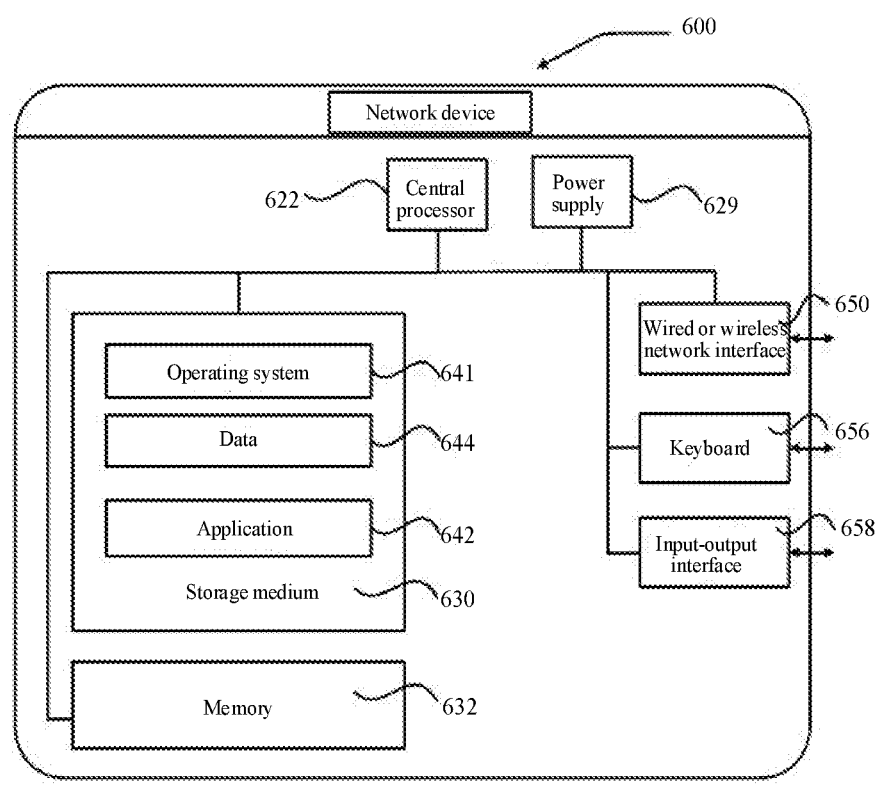
FIG. 6 is a structural schematic diagram of a network device provided in an embodiment of the present disclosure.

FIG. 6 is a structural schematic diagram of a network device provided in an embodiment of the present disclosure. The network device 600 may have a relatively large difference due to different configurations or performance, and may include one or more central processors 622 (for example, one or more processors), a memory 632, and one or more storage mediums 630 (for example, one or one mass storage devices) storing a storage application 642 or data 644. Herein, the memory 632 and the storage medium 630 may be capable of temporary storage or permanent storage. The program stored in the storage medium 630 may include one or more modules (not shown in the figure), and each module may include a series of instruction operations for the network device 600. In this embodiment, the central processor 622 may be configured to communicate with the storage medium 630 and execute a series of instruction operations in the storage medium 630 on the network device 600.

The network device 600 may also include one or more power supplies 629, one or more wired or wireless network interfaces 650, one or more input-output interfaces 658, one or more keyboards 656, and/or one or more operating systems 641, such as Windows Server, Mac OS X, Unix, Linux, FreeBSD, etc.

The network device 600 may include a memory, and one or more programs stored in the memory and configured to be executed by one or more processors, and the one or more programs may include instructions for performing the data transmission described above.

Those skilled in the art may understand that all or some steps of the embodiments described above may be completed by hardware, or by a program instructing related hardware, and the program may be stored in a computer readable storage medium. The storage medium described above may be a read only memory, a magnetic disk, an optical disk or the like.

The described above are only preferred embodiments of the present disclosure, which are not intended to limit the present disclosure. Any modifications, equivalent substitutions, improvements or the like made within the spirit and principle of the present disclosure shall be included in the protection scope of the present disclosure.

What is claimed is:

1. A method for data transmission, comprising:
establishing, by a sending end, a communication connection with a receiving end;
splitting, by the sending end, a data packet to be transmitted into multiple data units;
transmitting, by the sending end, the multiple data units to the receiving end through multiple data streams; and
sending, by the sending end, a data stream addition request to the receiving end according to data transmission condition of the multiple data streams to cause the receiving end to create a new data stream based on the communication connection after receiving the data stream addition request.

2. The method according to claim 1, wherein establishing, by the sending end, the communication connection with the receiving end comprises:
sending, by the sending end, a connection establishment request carrying load information of the sending end to the receiving end; establishing, by the receiving end, the communication connection with the sending end; and initializing, by the receiving end, the multiple data streams on the communication connection based on the load information of the sending end and load information of the receiving end.

3. The method according to claim 2, wherein:
before sending, by the sending end, the connection establishment request carrying the load information of the sending end to the receiving end, the method further comprises:
detecting, by the sending end, the load information of the sending end; and
adding, by the sending end, the load information of the sending end that is detected to the connection establishment request;
and initializing, by the receiving end, the multiple data streams on the communication connection based on the load information of the sending end and the load information of the receiving end comprises:
computing, by the receiving end, a number of the data streams and a flow window size of each of the data streams based on the load information of the sending end and the receiving end; and
initializing, by the receiving end, the multiple data streams on the communication connection based on the number of the data streams and the flow window size of each of the data streams that are computed;
wherein the load information comprises a number of CPU cores, load of each CPU, and usage of memory and bandwidth.

4. The method according to claim 2, wherein the connection establishment request further carries data stream IDs of the multiple data streams that is generated by the sending end;
after transmitting, by the sending end, the multiple data units to the receiving end through the multiple data streams, the method further comprises:
sending, by the sending end, a connection reestablishment request carrying the data stream IDs to the receiving end when the communication connection with the receiving end is interrupted; restoring, by the receiving end, the multiple data streams according to the data stream IDs; and continuing, by the sending end, to transmit the multiple data units based on the multiple data streams.

5. The method according to claim 1, wherein splitting, by the sending end, the data packet to be transmitted into the multiple data units comprises:
   determining, by the sending end, a data packet splitting rule based on a size and type of the data packet to be transmitted, load information of the sending end and load information of the receiving end; and
   splitting, by the sending end, the data packet to be transmitted into multiple small data packets according to the data packet splitting rule, and splitting, by the sending end, each of the small data packets into the multiple data units.

6. The method according to claim 5, wherein one data stream transmits multiple data units, and multiple data units of one small data packet are transmitted in multiple data streams;
   wherein the sending end transmits data units with different data volume in different data streams according to a load status of each of the data streams.

7. The method according to claim 6, wherein after splitting, by the sending end, the data packet to be transmitted into the multiple small data packets, the method further comprises:
   caching, by the sending end, an offset position of each of the small data packets in the data packet to be transmitted;
   and the method further comprises:
   determining, by the sending end, a target small data packet and a data offset that correspond to a target data unit according to the unit ID when receiving a data retransmission request carrying the unit ID of the target data unit sent by the receiving end; and
   regenerating, by the sending end, the target data unit based on the offset position of the target small data packet in the data packet to be transmitted and the data offset, and sending, by the sending end, the target data unit to the receiving end.

8. The method according to claim 5, wherein after splitting, by the sending end, each of the small data packets into the multiple data units, the method further comprises:
   for any data unit, generating, by the sending end, an unit ID of the data unit based on an small packet ID of a small data packet to which the data unit belongs and a data offset of the data unit in the small data packet, and adding, by the sending end, the unit ID to the data unit.

9. The method according to claim 8, wherein after transmitting, by the sending end, the multiple data units to the receiving end through the multiple data streams, the method further comprises:
   caching, by the receiving end, the multiple data units sent by the sending end through the multiple data streams;
   extracting, by the receiving end, unit IDs carried in the multiple data units; and
   assembling, by the receiving end, the multiple data units that are cached into the small data packet according to the unit IDs.

10. The method according to claim 1, wherein the sending end establishes the communication connection with the receiving end when needing to remotely call a method function of the receiving end; and
   wherein:
   the communication connection is an on-demand connection in which the sending end actively initiates establishment with the receiving end when needing to perform a remote call and actively disconnects with the receiving end after the remote call ends; or
   the communication connection is a long-lived connection in which a connection between the sending end and the receiving end is maintained for a long time whether or not the data packet to be transmitted is sent, and multiple remote call processes are able to use the same communication connection.

11. The method according to claim 1, wherein the method further comprises:
   sending, by the sending end, a data stream interruption request to the receiving end according to data transmission condition of the multiple data streams and/or load status of a device; and interrupting, by the receiving end, a target data stream corresponding to the data stream interruption request after receiving the data stream interruption request to stop receiving the data units on the target data stream.

12. The method according to claim 1, wherein the method further comprises:
   receiving, by the sending end, a flow adjustment instruction sent by the receiving end, and adjusting, by the sending end, a flow window size of a data stream according to a stream identification and a specified flow threshold carried in the flow adjustment instruction.

13. A system, comprising a sending end and a receiving end, wherein the sending end comprises at least one processor and a memory, and the receiving end comprises at least one other processor and another memory; wherein both the memory and the another memory store at least one instruction, at least one program, a code set or an instruction set; and the at least one instruction, the at least one program, the code set or the instruction set is loaded and executed by the at least one processor and the at least one other processor to perform a method for data transmission; wherein the method comprises:
   establishing, by the sending end, a communication connection with the receiving end;
   splitting, by the sending end, a data packet to be transmitted into multiple data units;
   transmitting, by the sending end, the multiple data units to the receiving end through multiple data streams; and
   sending, by the sending end, a data stream addition request to the receiving end according to data transmission condition of the multiple data streams; and
   creating, by the receiving end, a new data stream based on the communication connection after receiving the data stream addition request.

14. The system according to claim 13, wherein establishing, by the sending end, the communication connection with the receiving end comprises:
   sending, by the sending end, a connection establishment request carrying load information of the sending end to the receiving end; establishing, by the receiving end, the communication connection with the sending end; and initializing, by the receiving end, the multiple data streams on the communication connection based on the load information of the sending end and load information of the receiving end.

15. The system according to claim 14, wherein the connection establishment request further carries data stream IDs of the multiple data streams that are generated by the sending end;
   after transmitting, by the sending end, the multiple data units to the receiving end through the multiple data streams, the method further comprises:
   sending, by the sending end, a connection reestablishment request carrying the data stream IDs to the receiving end when the communication connection with the receiving end is interrupted; restoring, by the receiving end, the multiple data streams according to the data stream IDs; and continuing, by the sending end, to transmit the multiple data units based on the multiple data streams.

16. The system according to claim 13, wherein splitting, by the sending end, the data packet to be transmitted into the multiple data units comprises:
   determining, by the sending end, a data packet splitting rule based on a size and type of the data packet to be transmitted, load information of the sending end and load information of the receiving end; and
   splitting, by the sending end, the data packet to be transmitted into multiple small data packets according to the data packet splitting rule, and splitting, by the sending end, each of the small data packets into the multiple data units.

17. The system according to claim 16, wherein after splitting, by the sending end, each of the small data packets into the multiple data units, the method further comprises:
   for any data unit, generating, by the sending end, an unit ID of the data unit based on an small packet ID of a small data packet to which the data unit belongs and a data offset of the data unit in the small data packet, and adding, by the sending end, the unit ID to the data unit.

18. The system according to claim 16, wherein after splitting, by the sending end, the data packet to be transmitted into the multiple small data packets, the method further comprises:
   caching, by the sending end, an offset position of each of the small data packets in the data packet to be transmitted;
   and the method further comprises:
   determining, by the sending end, a target small data packet and a data offset that correspond to a target data unit according to the unit ID when receiving a data retransmission request carrying the unit ID of the target data unit sent by the receiving end; and
   regenerating, by the sending end, the target data unit based on the offset position of the target small data packet in the data packet to be transmitted and the data offset, and sending, by the sending end, the target data unit to the receiving end.

19. A non-transitory computer readable storage medium storing at least one instruction, at least one program, a code set or an instruction set; wherein the at least one instruction, the at least one program, the code set or the instruction set is loaded and executed by a processor to perform the following processing:
   establishing a communication connection with a receiving end;
   splitting a data packet to be transmitted into multiple data units;
   transmitting the multiple data units to the receiving end through multiple data streams; and
   sending a data stream addition request to the receiving end according to data transmission condition of the multiple data streams to cause the receiving end to create a new data stream based on the communication connection after receiving the data stream addition request.

* * * * *